July 4, 1939. L. B. SMITH 2,164,478
RADIATOR PRESSURE CAP
Filed Jan. 9, 1937
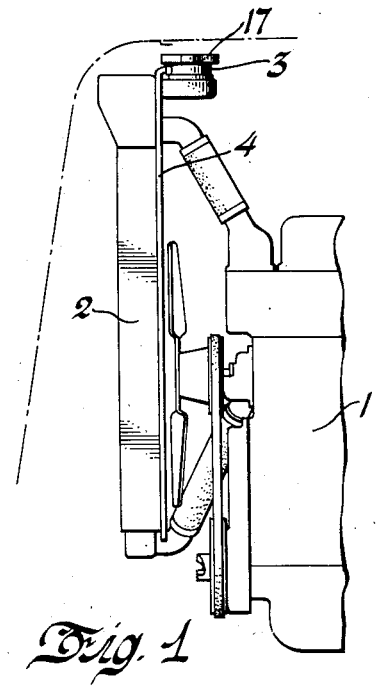
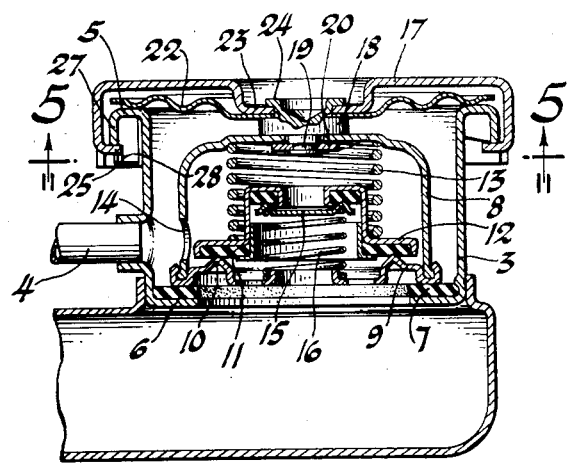
Inventor
Lucian B. Smith
By Blackmore, Sower & Flint
Attorneys Patented July 4, 1939

2,164,478

UNITED STATES PATENT OFFICE 2,164,478

RADIATOR PRESSURE CAP

Lucian B. Smith, Flint, Mich., assignor to General Motors Corporation, Detroit, Mich., a corporation of Delaware Application January 9, 1937, Serial No. 119,740

8 Claims. (Cl. 220—24)

This invention relates to valved closure caps for radiator filler spouts.

For the operation of an engine cooling system under internal pressure it is common practice to provide as a part of the removable filler cap unit, a cage containing a pressure relief valve which closes the system from the usual overflow or vent pipe. According to the present invention the cage is nested within the spout with its lower edge bearing on a sealing gasket carried by the spout and a swivel connection between the cage and the rotatable mounting cap insures a firm seating of the cage on the gasket without a rubbing action and consequent wear. The assembly of the parts is effected through a specially designed connection which not only simplifies manufacture and reduces cost but also affords an effective seal against leakage and a free swivel joint for the internally positioned valve cage.

For a better understanding of the invention reference is made to the accompanying drawing wherein Figure 1 is a side elevation of the front portion of an engine and a radiator associated therewith; Figure 2 is a vertical sectional view through the filler structure; Figure 3 is an elevation of the closure spout with the cap removed; Figure 4 is a top plan view of the cap and Figure 5 is a bottom plan view of the cage mounting looking in the direction of the arrows on line 5—5 of Figure 2.

A conventional engine cooling system is illustrated in Figure 1 and includes a jacketed cylinder block 1 and a radiator 2 connected with the engine jacket for the circulation of cooling liquid. The top tank of the radiator has a filler spout 3 with an overflow pipe 4 leading therefrom. On opposite sides of the overflow are a pair of spaced seats including an outturned flange 5 at the top of the spout and an inturned flange 6 at the bottom of the spout and a sealing gasket 7 is carried by the lower flange 6. Engaged with the gasket 7 to seal the system from the overflow pipe 4, is a valve cage in the form of a stamped cup 8 having its lower end closed by a centrally apertured plate 9. Beyond the openings through the plate 9 is an annular ridge 10 which forms a seat for a gasket 11 carried by a domed plate 12 against which acts a coil spring 13 interposed between the plate 12 and the top wall of the cage 8. The seal between the gasket 11 and the seat 10 is broken whenever internal system pressure is sufficient to raise the plate 12 against the spring 13 for communication through one or more openings 14 in the cage with the overflow pipe. Relief of subatmospheric pressure inside the system is effected through a central opening in the plate 12 normally closed by a disc valve 15 which is seated by a coil spring 16 bearing on the cover 8.

The cage is secured to the cap 17 by a special rivet construction comprising a spacer disc 18 having reduced portions projected from opposite faces. On its underside the projected portion is in the form of a shouldered pin 19 which extends through an opening in the top wall of the cup 8 with its end riveted over a retaining washer 20 to provide a loose pivotal joint for the valve cage. The opposite projection is in the form of a hollow sleeve which extends through alined openings in a spring disc or sealing diaphragm 22 and a depressed central boss 23 formed in the cap 17, the sleeve being rolled over or riveted as at 24 to secure the cap and disc between the outturned lip 24 and the spacer disc 18 in leakproof relation. The disc 22 extends outwardly from the depressed boss 23 in spaced relation to the cap 17 and at its rim is adapted for sealing contact with the outturned flange 5 of the spout.

A simple bayonet type connection is contemplated between the cap and spout and for this purpose the skirt of the cap is provided at diametrically opposite points with inturned lugs 25 which are adapted for passage through openings 26 in the flange 5 and into engagement with the bottom edge of a depending wall 27 carried by the flange 5. This bottom edge has a cam profile which extends from the entrance opening 26 to a stop shoulder 28 so that upon rotation of the cap 17 the lugs 25 ride on the camming surfaces between the entrance 26 and shoulder 28 and, therefore, move the assembly into and out of the spout 3. In the final seating position defined by the shoulder 28 the system is sealed from the vent by engagement of the cage with the internal gasket 7 carried by the spout. This seal is broken to vent the system upon reverse rotation of the cap as the locking lug 25 rides up the cam surface toward the entrance opening 26. In order to insure a momentary delay for venting the system prior to complete removal of the cap, a ratchet tooth or stop shoulder 29 may be provided as a part of the camming surface immediately adjacent the entrance opening 26.

From the above description it will be apparent that relative rotation between the spout and cap upon the application and removal of the closure assembly occurs without relative rotation and scrubbing of the seating surfaces on the cage and gasket.

I claim:

1. In a device of the character described, a spout closure cap having a depressed centrally positioned and apertured boss, a plug closing said aperture and riveted to the boss, a spring disc centrally secured to the boss by said riveted plug and a cage adapted to house and seat a pressure operated vent valve and swivelly mounted on said plug.

2. For use with a vented filler spout having a pair of spaced seats, a removable closure cap having a spring sealing disc engageable with one of said seats, and a valve seating cage within the spout engageable with the other seat and being characterized by means joining the cage, the disc and the cap as a unit assembly, including a connecting member having one end riveted to the cap and rigidly securing the spring disc on the underside of the cap and having at its opposite end a swivel connection with the cage.

3. A closure assembly for a vented filler spout, including a rotatable mounting member, a sealing diaphragm engageable with a seat on the spout, a non-rotatable valve seating cage engageable with a second seat on the spout and being characterized by a connection between said parts having one end secured to the mounting member and fastening the sealing diaphragm thereto and having its other end swivelly joined to the valve cage.

4. In a removable closure assembly for a vented filler spout wherein a sealing diaphragm is engageable with a spout seat and is carried by, a spout engaging and attaching member which also carries, a vent controlling valve cage engageable with a second spout seat, a shouldered member having at one end a hollow skirt projected through openings in the diaphragm and the member and peened over to secure said parts, and having at the other end a shouldered pin projected through an opening in the valve cage and a retainer washer riveted to the shouldered pin beyond the cage to afford a swivel cage mounting.

5. A filler cap structure for a spout having a pair of spaced seats and a vent between said seats, including a rotatable cap detachably engageable with the spout, a seal engaging the outermost seat, a pressure operated valve housing and seating cage located internally of the spout in sealing engagement with the innermost seat, said cap structure being characterized by a connector having a rivet extension at one end projected through said seal and cap and expanded into tight securement therewith and having a rivet extension at its opposite end projected through the cage wall to swivelly mount the cage on the cap and enable cap rotation without relative rotation of the cage and its seat.

6. A filler spout closure unit having a valve seating cage adapted to engage and seat on the spout, a detachable spout engaging connector and a diaphragm seal adapted to engage a second seat on the spout and being characterized by a fastener between said parts comprising a spacer disc, a rivet extension on one side of the disc joining said connector and seal, a dependent extension on the other side of the disc and means carried by said extension and cooperating with the disc to provide an annular groove in which the cage is swivelly received.

7. In a pressure relief filler spout closure of the character described, a detachable mounting member, a seal adapted to engage an outer spout seat, a rivet connector between the seal and mounting member, having an internal dependent extension, a valve seating cage adapted itself to seat on a second seat on the spout and constitute an inner seal and means swivelly mounting the cage on said internal dependent extension of the rivet connector.

8. The combination with a removable filler spout cap, a diaphragm seal to engage a spout outer seat and a valve cage to engage a spout inner seat, of a fastener between said parts including a plug having a shouldered portion at its upper end riveted to the cap and nonrotatably securing the diaphragm thereto and a shouldered portion at its lower end receiving the valve cage and a retainer on said lower shouldered portion for swivelly mounting the cage thereon.

LUCIAN B. SMITH.